J. A. KIESELE.
Candle-Holder for Christmas-Trees.
No. 227,693. Patented May 18, 1880.
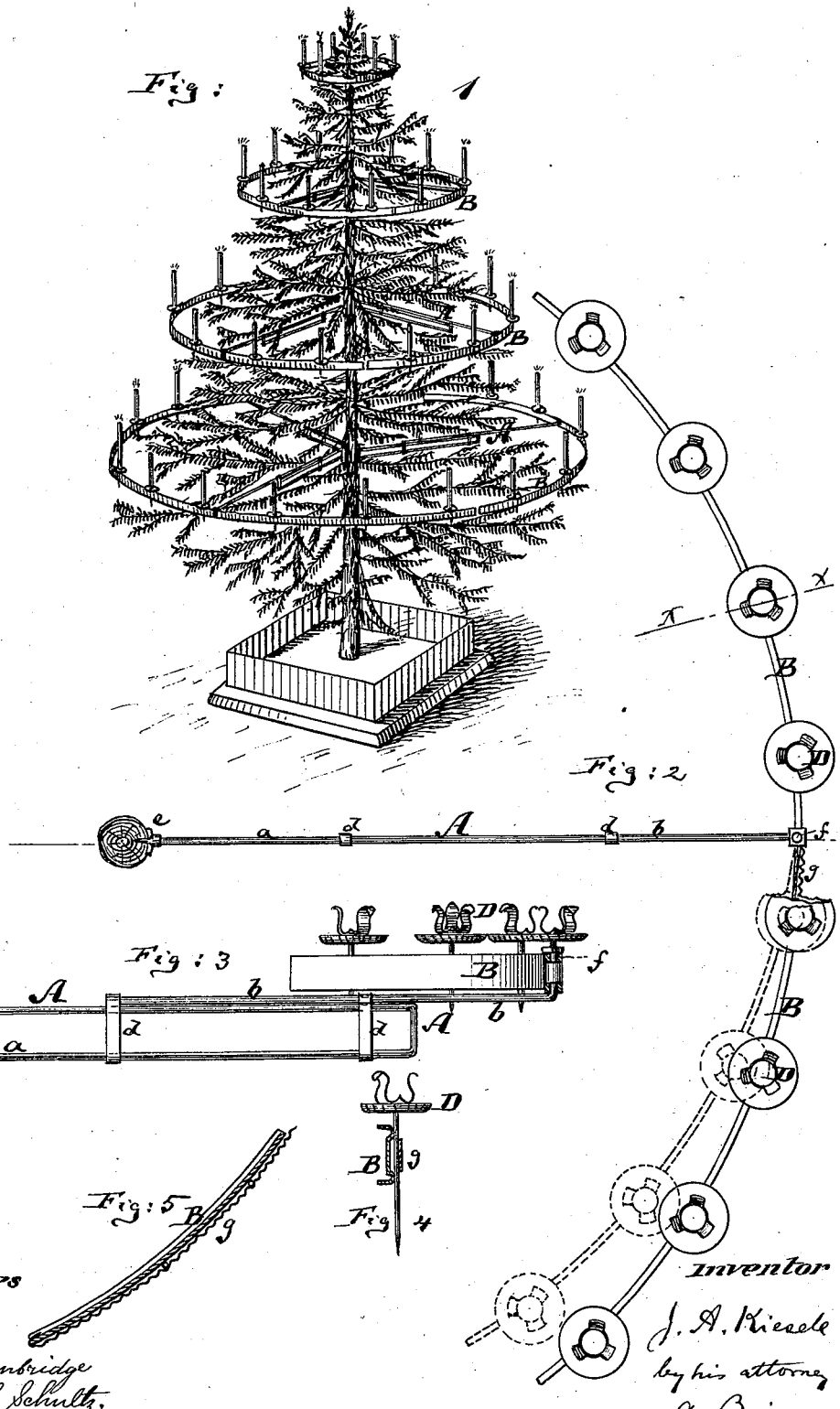
Witnesses
John C. Tunbridge
Willy F. E. Schultz
Inventor
J. A. Kiesele
by his attorney
A. v. Briesen

UNITED STATES PATENT OFFICE.

JOHN A. KIESELE, OF NEW YORK, N. Y.

CANDLE-HOLDER FOR CHRISTMAS-TREES.

SPECIFICATION forming part of Letters Patent No. 227,693, dated May 18, 1880.

Application filed October 8, 1879.

*To all whom it may concern:*

Be it known that I, JOHN AUGUST KIE-SELE, of New York, in the county and State of New York, have invented a new and Improved Candle and Ornament Holder for Christmas-Trees, of which the following is a specification.

The object of this invention is to provide an attachment to Christmas-trees for the support of candles and other ornaments, and to relieve the branches of the trees from undue weight.

The invention consists, principally, in combining arched candle-holders that are adapted to partly embrace the tree with a radial stem, which is adapted to be secured to the trunk of the tree.

The invention also consists in making said stem extensible, and in other details of improvement hereinafter more fully described.

In the accompanying drawings, Figure 1 is a perspective view of a tree having my improved candle-supports. Fig. 2 is a top view of the same; Fig. 3, a side view of the same;
Fig. 4, a cross-section of the same on line $x\,x$, Fig. 2; and Fig. 5, a detail longitudinal section of part of the same.

The letter A represents the extension-stem, and the letters B B the arched wings, of my improved candle-holder.

The stem A is made of two or more frames, *a b*, which are made of wire or other suitable material, and which are connected by cross-pieces *d d*, or otherwise, so as to be readily extensible and contractible.

The innermost frame, *a*, has an end piece, *e*, which is perforated or otherwise so constructed as to be readily fastened to the trunk of a tree, as shown.

To the outer end of the outer frame, *b*, are hinged or pivoted at *f* the wings B B, which are arched, as shown, so that a more or less complete circle may be described by a series of these wings around the tree, as indicated in Fig. 1. The wings, being pivoted, can be swung into any desired position. (See dotted lines in Fig. 2.) Now, it is quite clear that for cheaper goods one or more of the wings may be rigidly or pivotally connected to a stem, A, which need not be extensible; and I do not limit myself, therefore, to the use of the extension-stem, nor to any number of wings on the stem, nor to the use of the pivot for connecting the wings to the stem.

The wings are lined with a piece, *g*, of corrugated sheet metal, or otherwise made with apertures, or adapted to receive and hold suitable candlesticks D and other Christmas-tree ornaments. The corrugated strip *g* is preferable, because it assists in ornamenting the wings, and forms a great many cavities, which allow any suitable spacing of the candlesticks.

I claim—

1. A candle and ornament holder for Christmas-trees constructed of a stem, A, having fastening-plate *e*, and of one or more wings, B, substantially as herein shown and described.

2. The combination of the extensible sectional stem A with one or more wings, B, substantially as herein shown and described.

3. The candle or ornament holder constructed of the stem A, wing or wings B, and pivot *f*, substantially as herein shown and described.

JOHN AUGUST KIESELE.

Witnesses:
 TOMPSON B. MOSHER,
 WILLY G. E. SCHULTZ.